United States Patent [19]
Shockley, Jr.

[11] 3,900,006
[45] Aug. 19, 1975

[54] CONTAINERIZED CAGE SYSTEM FOR CHICKENS

[76] Inventor: Walter I. Shockley, Jr., Box 180, Dagsboro Rd., Salisbury, Md. 21801

[22] Filed: July 27, 1973

[21] Appl. No.: 383,311

[52] U.S. Cl. ............................... 119/18; 119/52 B
[51] Int. Cl. ........................................... A01k 31/18
[58] Field of Search ... 119/17, 18, 22, 52 B, 52 AF; 220/19, 84, 83, 23.83

[56] References Cited
UNITED STATES PATENTS

| | | | |
|---|---|---|---|
| 1,506,570 | 8/1924 | Dean | 119/17 |
| 1,644,472 | 10/1927 | Hatch | 119/17 |
| 3,042,000 | 7/1962 | McMurray et al. | 119/18 X |
| 3,159,139 | 12/1964 | Haggard et al. | 119/18 X |
| 3,254,627 | 6/1966 | Cross | 119/18 X |
| 3,604,398 | 9/1971 | Peardon | 119/18 X |
| 3,738,323 | 6/1973 | Boterweg | 119/18 |
| 3,785,345 | 1/1974 | Rhinehart | 119/18 |

Primary Examiner—Louis G. Mancene
Assistant Examiner—J. N. Eskovitz
Attorney, Agent, or Firm—Clarence A. O'Brien; Harvey B. Jacobson

[57] ABSTRACT

An assembly of cage units are provided with facilities for distributing feed, removing waste and otherwise sustaining growth of poultry in cooperation with supporting equipment in an enclosure from which the assembly is removable by a fork lift truck to be placed on a truck bed for transport to a poultry processing plant. The cage units also feature a flexible trampolin-like floor and internal illumination.

11 Claims, 5 Drawing Figures

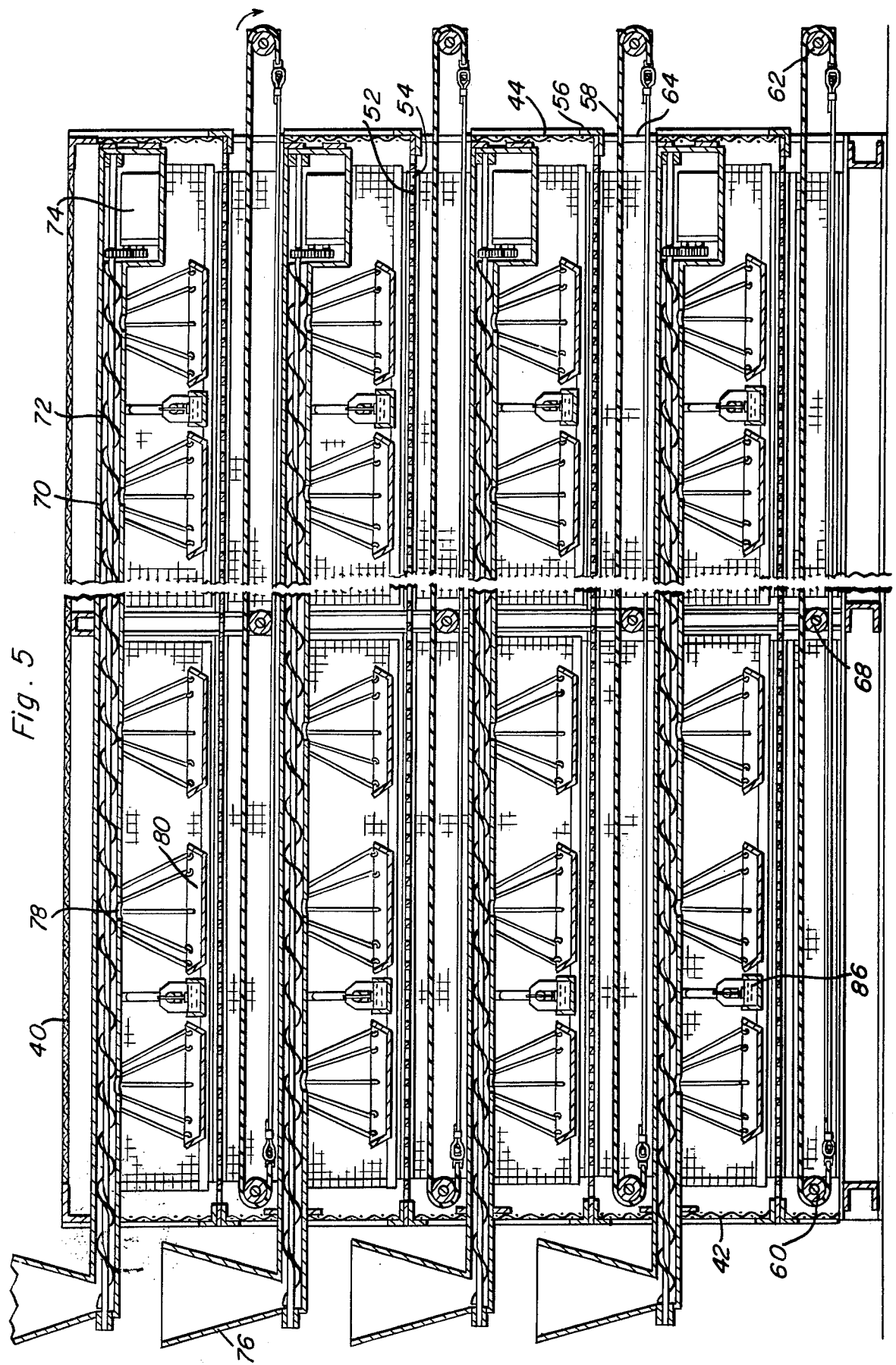

CONTAINERIZED CAGE SYSTEM FOR CHICKENS

This invention relates to the handling of poultry during growth from chick to maturity and transport to the poultry processor.

A system referred to as containerized production of poultry has been proposed for the poultry industry wherein chicks are grown to maturity and transported from the hatchery to the processor within a single cage assembly thereby reducing the amount of labor required for handling. Such a system is disclosed, for example, in U.S. Pat. No. 3,635,197 to Van Huis. The cage constructions of prior systems are such that special building enclosures, transport vehicles and a considerable amount of supporting equipment is required. Further, there is an increased tendency for injury to birds during transport. It is therefore an important object of the present invention to provide a containerized poultry production system that avoids the aforementioned problems of prior systems by reducing the amount of growth sustaining equipment required for servicing the cage assembly and making the cage assembly safer for the birds, while at the same time further reducing the amount of manual servicing required.

In accordance with the present invention, an assembly of wire mesh cages are provided with flexible, trampolin-like floors having perforations therein overlying conveyor belts through which droppings are conveyed to one end of the cage assembly and deposited into a pit in the concrete floor of a building enclosure. The building enclosure is environmentally controlled by heaters and a ventilation system. Electrical energy connections are established within the enclosure to various power operated components of the cage assembly including feed distributing and waste removal conveyors and lamps. The cage units are constructed to accommodate the conveyors which project from opposite ends of the assembly to receive feed and discharge waste. The base of the cage assembly accommodates reception of fork-lift arms so that it may be placed on a truck bed for transport purposes.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 5 is a side section view taken substantially through a plane indicated by section line 5—5 in FIG. 3.

Figure 1:
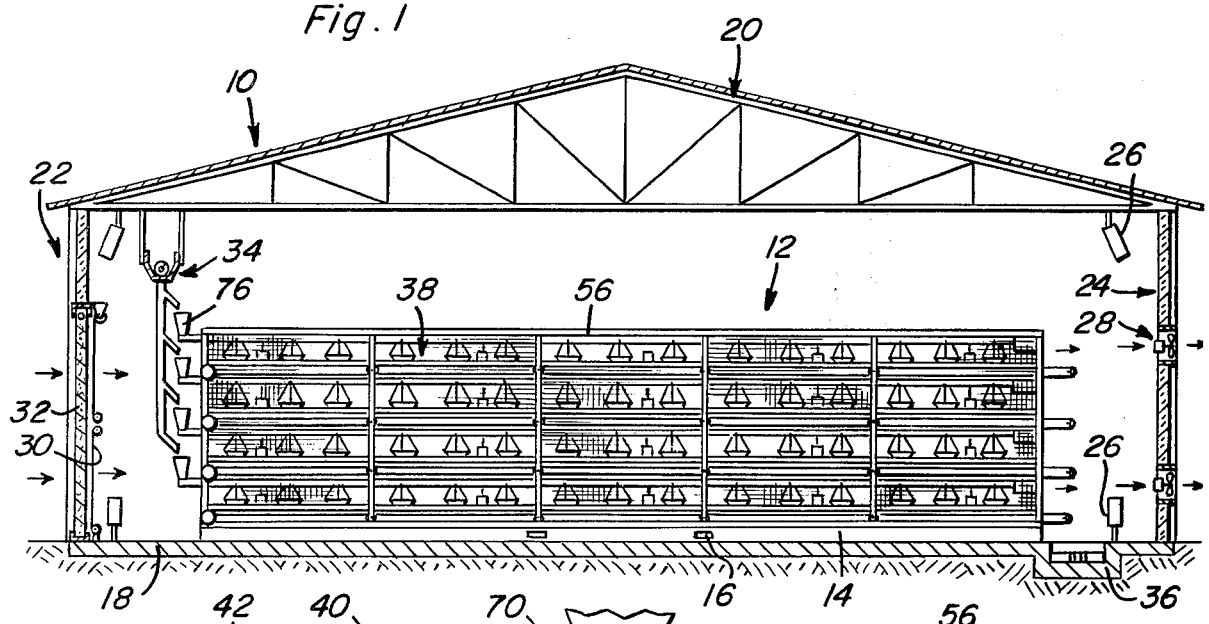
FIG. 1 is a simplified side sectional view through a typical building enclosure housing a cage assembly constructed in accordance with the present invention and shown in side elevation.

Referring now to the drawings in detail, FIG. 1 illustrates a typical building 10 that is either specially built or reconditioned from an existing poultry house. The building ends (not shown) may be opened for removal of a cage assembly 12 by means of a fork lift truck. The base 14 of the cage assembly is accordingly provided with openings 16 for receiving forklift arms. The cage assembly rests on a concrete floor 18 of the building with sufficient clearance below a truss type roof 20 and in spaced relation to transparent side walls 22 and 24.

The environment within the building is controlled temperature-wise by a plurality of electric heaters and by a ventilation system including electric motor operated fans 28 mounted within the side wall 24. The building is preferably orientated so that the wall 22 faces south whereby the amount of sunlight entering may be regulated by vertically movable curtains 30 power operated by a winch system. The curtains will also control the amount of air drawn into the building through evaporative pads 32 in the side wall 22 in order to obtain a controlled cooling effect during hot weather.

The building is provided with electrical power hook-ups for the various power operated and electrical devices aforementioned as well as a motor operated feed supply conveyor 34 suspended from the roof assembly adjacent the side wall 22 to supply feed to one end of the cage assembly from some location externally of the building. Waste is collected from the cage assembly adjacent the opposite side wall 24, through which air is exhausted by the fans 28, by means of a material displacing conveyor in a waste collecting pit 36 formed in the concrete floor 18.

Figure 4:
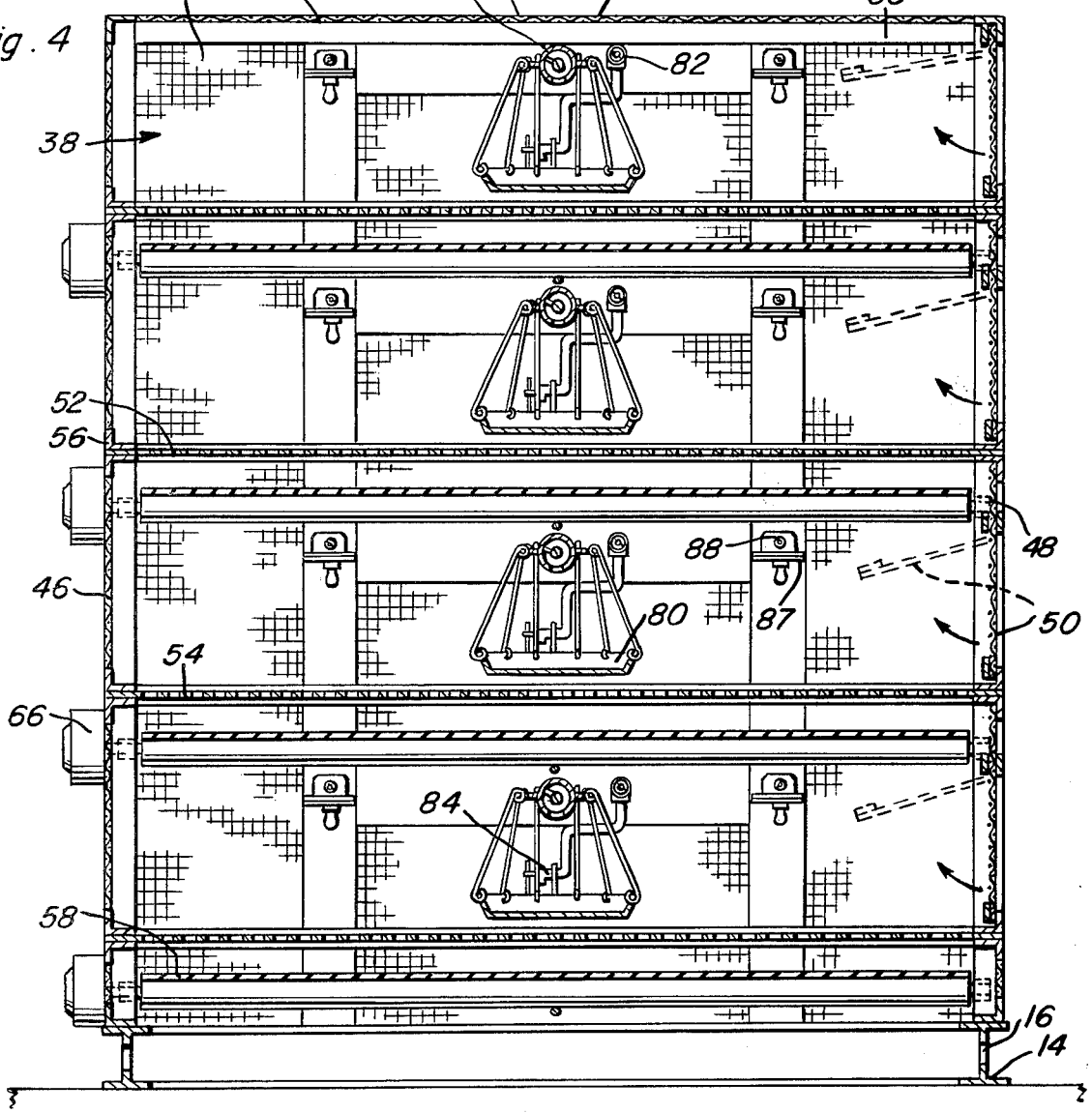
FIG. 4 is a transverse section view taken substantially through a plane indicated by section line 4—4 in FIG. 2.
Figure 2:
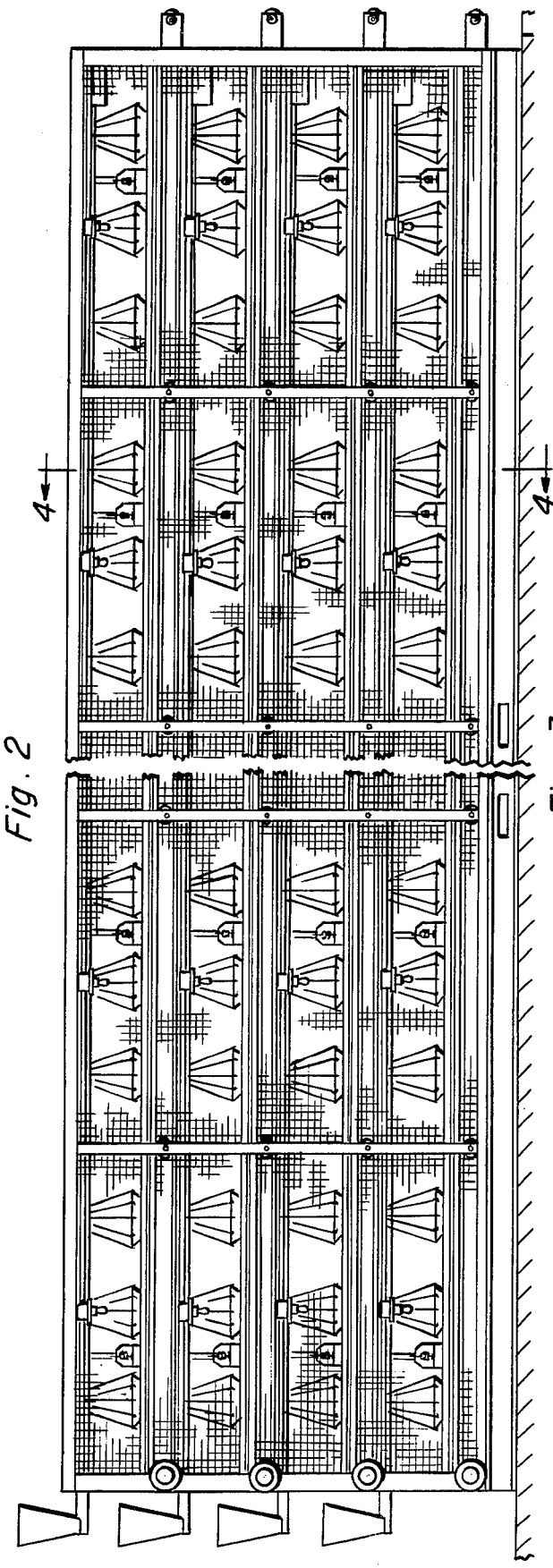
FIG. 2 is an enlarged, partial side elevation view of the cage assembly.
Figure 3:
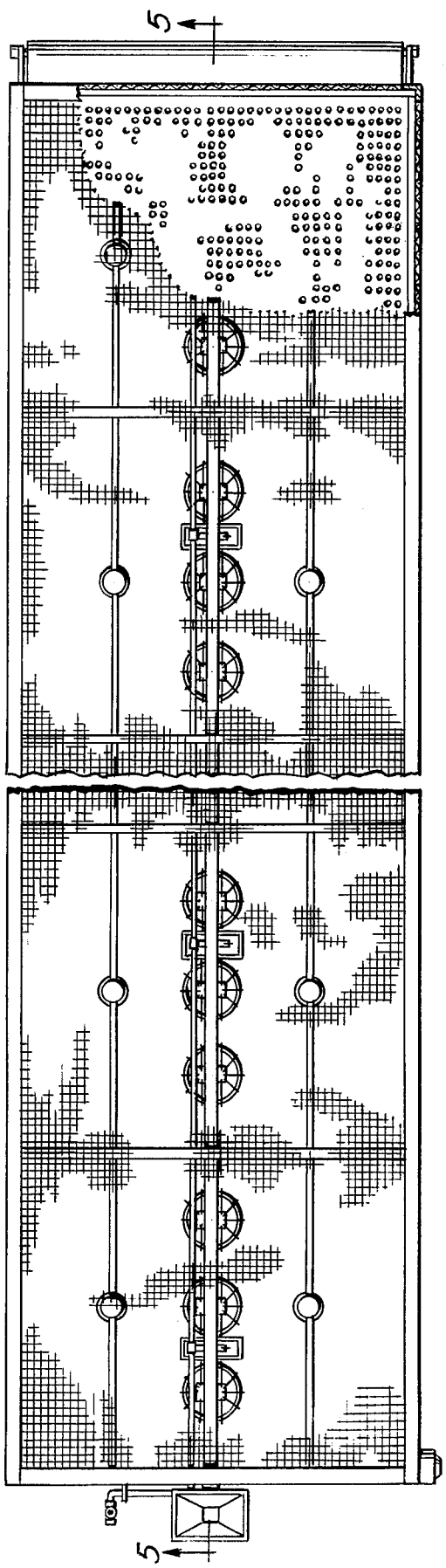
FIG. 3 is a top plan view of the cage assembly shown in FIG. 2.

The cage assembly is dimensioned to fit within the building 10 as well as on the bed of a truck trailer to which it is suitably anchored during transport. A plurality of cage units 38 are vertically stacked in tiers between the base 14 and a wire mesh top wall 40 as more clearly seen in FIGS. 4 and 5. In each tier, a plurality of cage units 38 are interconnected in end to end relation between the feed receiving, wire mesh end walls 42 and the opposite waste discharging, wire mesh end walls 44 as more clearly seen in FIG. 5. As more clearly seen in FIG. 4, each cage unit is provided with wire mesh side walls 46 and 48 with an access door 50 formed in side wall 48 as shown by dotted line. The cage units in each tier are also provided with a trampoline-like floor 52 formed from a flexible sheet of plastic provided with a plurality of perforations. The floor 52 is accordingly secured only at its peripheral edges to the frame members 56 which are interconnected to form a rigid frame assembly outlining each of the cage units to which the wire mesh walls 40, 42, 44, 46 and 48 are secured.

Underlying each of the floors 52, is a conveyor belt 58 entrained about an end roller 60 rotatably mounted adjacent the end walls 42 of the cage assembly and an end roller 62 supported externally of the cage assembly adjacent the end walls 44. The conveyor belt thus extends through openings formed between the vertical tiers of the cage assembly. Reversible drive motors 66 may be supported on the frame of the cage assembly and connected to end rollers 60 for periodic movement of droppings collected on the conveyor belts 58 toward the delivery ends at rollers 62 overlying the waste collection pit 36. Intermediate rollers 68 support the conveyor belts between the end rollers.

Feed is delivered to each of the cage units by feed tubes 70 that extend through each tier of cage units in vertically spaced relation to the conveyor belts 58, above each floor 52. An auger type conveyor 72 within each feed tube is driven by a motor 74 through suitable gearing adjacent the end walls 44. The feed tubes extend out of the cage assembly at end walls 42 and are connected to hoppers 76 into which feed is deposited by the building feed supply conveyor 34. When operated, the auger conveyor 72 will distribute feed from the hopper 76 through openings 78 in the feed tube into receptacles 80 suspended from the feed tube within each cage unit as more clearly seen in FIGS. 4 and 5. Similarly, water may be supplied through conduits 82 discharging through outlets 84 into watering cups 86 within each cage unit. Also, mounted in substantially coplanar relation to the feed tubes 70 are lamp assemblies 87 within each cage unit electrically connected to a source of electrical power externally of the cage assembly through electrical cables 88.

It will be apparent from the foregoing description that growth of birds placed into the cage assembly when hatched as chicks may be sustained by supply of feed and water and removal of waste by simple electrical hook ups of the conveyor operating motors, without removal of the birds from the cage assembly. Illumination may also be provided through a simple electrical hookup. The interior building environment is also regulated by heaters, evaporative cooling, fan induced ventilation and sunlight control during the growth period. The cage assembly may be readily removed from the building at the desired poultry growth stage and transported to the processor without any disassembly or handling problems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A poultry cage adapted to be transported from an environmentally controlled enclosure, comprising a box-like frame, foraminous walls supported by the frame, a flexible, trampoline-like floor made of a resilient sheet of material having perforations formed therein, means securing the floor only peripherally to the frame for elastic deformation under load, and conveyor belt means supported by the frame in spaced underlying relation to the floor for receiving and conveying droppings.

2. The combination of claim 1 including a base to which said frame is secured, said base having fork-lift receiving openings.

3. The combination of claim 2 including a feed conveyor extending between said end walls above the floor, a plurality of feed storing receptacles suspended from the feed conveyor, power operated means mounted adjacent to one of said end walls and drivingly connected to the feed conveyor for distributing feed amongst said receptacles, and an inlet feed hopper connected to said conveyor adjacent to the other of said end walls externally of the cage.

4. The combination of claim 3, including means mounted in substantially coplanar relation to the feed conveyor for internally illuminating the cage.

5. The combination of claim 4 wherein said enclosure includes ventilation means for inducing a controlled flow of air through the cage.

6. The combination of claim 5 wherein said enclosure further includes a pit to which droppings are delivered by said conveyor belt means and means for removing droppings collected within said pit.

7. The combination of claim 1 including a feed conveyor extending between said end walls above the floor, a plurality of feed storing receptacles suspended from the feed conveyor, power operated means mounted adjacent to one of said end walls and drivingly connected to the feed conveyor for distributing feed amongst said receptacles, and an inlet feed hopper connected to said conveyor adjacent to the other of said end walls externally of the cage.

8. The combination of claim 7, including means mounted in substantially coplanar relation to the feed conveyor for internally illuminating the cage.

9. The combination of claim 1 wherein said enclosure includes ventilation means for inducing a controlled flow of air through the cage.

10. The combination of claim 9 wherein said enclosure further includes a pit to which droppings are delivered by said conveyor belt means and means for removing droppings collected within said pit.

11. The combination of claim 1 wherein said enclosure includes a pit to which droppings are delivered by said conveyor belt means and means for removing droppings collected within said pit.

* * * * *